United States Patent
Bonner et al.

(10) Patent No.: US 7,137,556 B1
(45) Date of Patent: Nov. 21, 2006

(54) SYSTEM AND METHOD FOR DIMENSIONING OBJECTS

(76) Inventors: Brett Bracewell Bonner, 164 Walnut Bend Cove, Memphis, TN (US) 38113; Ole-Petter Skaaksrud, 6945 Stone Ridge Dr. #33, Memphis, TN (US) 38113; Gary Lynn Holmes, 8498 Mysen Cove, Cordova, TN (US) 38018

( * ) Notice: Subject to any disclaimer, the term of this patent is extended or adjusted under 35 U.S.C. 154(b) by 0 days.

(21) Appl. No.: 09/544,120

(22) Filed: Apr. 6, 2000

Related U.S. Application Data

(60) Provisional application No. 60/128,079, filed on Apr. 7, 1999, provisional application No. 60/151,620, filed on Aug. 31, 1999.

(51) Int. Cl.
*G06K 5/04* (2006.01)

(52) U.S. Cl. ............... 235/462.08; 235/462.01; 235/462.25; 235/462.41; 235/472.01; 235/472.02

(58) Field of Classification Search .......... 235/462.08, 235/462.25, 462.41, 462.01, 472.01, 472.02
See application file for complete search history.

(56) References Cited

U.S. PATENT DOCUMENTS

| | | | | |
|---|---|---|---|---|
| 4,992,649 A | * | 2/1991 | Mampe et al. | 235/462 |
| 5,237,163 A | * | 8/1993 | Collins, Jr. et al. | 235/472 |
| 5,253,302 A | | 10/1993 | Massen | |
| 5,291,564 A | * | 3/1994 | Shah et al. | 382/48 |
| 5,373,561 A | * | 12/1994 | Haber et al. | 713/157 |
| 5,402,364 A | | 3/1995 | Kitoh et al. | |
| 5,414,647 A | | 5/1995 | Ebenstein et al. | |
| 5,448,078 A | | 9/1995 | Nakazawa | |
| 5,719,678 A | | 2/1998 | Reynolds et al. | |
| 5,737,438 A | * | 4/1998 | Zlotnick et al. | 382/101 |
| 5,757,286 A | | 5/1998 | Jonsson et al. | |
| 5,769,640 A | * | 6/1998 | Jacobus et al. | 434/262 |
| 5,770,841 A | * | 6/1998 | Moed et al. | 235/375 |
| 5,815,274 A | | 9/1998 | Dlugos | |
| 5,848,188 A | | 12/1998 | Shibata et al. | |
| 5,923,017 A | * | 7/1999 | Bjorner et al. | 235/385 |
| 5,969,823 A | | 10/1999 | Wurz et al. | |
| 6,169,978 B1 | * | 1/2001 | Lutz et al. | 705/406 |
| 6,189,702 B1 | * | 2/2001 | Bonnet | 209/651 |
| 6,311,892 B1 | * | 11/2001 | O'Callaghan et al. | 235/175 |
| 6,360,947 B1 | * | 3/2002 | Knowles et al. | 235/462.01 |

(Continued)

FOREIGN PATENT DOCUMENTS

DE      197 38 849 C1    11/1998

(Continued)

OTHER PUBLICATIONS

Lawrence J. Curran, "Machine Vision and Barcode Inspection Identify Fast-Moving Parcels", Vision Systems Design, Sep. 1998, pp. 41-47.

(Continued)

*Primary Examiner*—Karl D. Frech
*Assistant Examiner*—Seung H Lee
(74) *Attorney, Agent, or Firm*—Finnegan, Henderson, Farabow, Garrett & Dunner, L.L.P.

(57) ABSTRACT

An information system for storing, retrieving, processing and displaying information captured about objects passing an information capture system. The captured and processed object information may include, for example, a visual representation of the object, a height representation of the object, an identification code from the object, dimensional information about the object, chemical signature information from the object, temperature information, date and time information, and a three dimensional model of the object. The various types of information can be accessed by users via a software interface.

13 Claims, 11 Drawing Sheets

U.S. PATENT DOCUMENTS 6,382,515 B1 * 5/2002 Good et al. ............ 235/472.01
6,517,004 B1 * 2/2003 Good et al. ............ 235/472.02

FOREIGN PATENT DOCUMENTS

| EP | 0 450 212 A1 | 10/1991 |
| --- | --- | --- |
| EP | 0 582 964 A | 2/1994 |
| EP | 0 672 993 A2 | 9/1995 |
| EP | 0 833 270 A2 | 4/1998 |
| WO | WO 97 40342 | 10/1997 |
| WO | WO 99/49411 | 9/1999 |

OTHER PUBLICATIONS

News Release, dated Sep. 2, 1997 from Adaptive Optics Associates, Inc., titled "*Adaptive Optics Wins FedEx Package Dimensioning Systems Contract*".

Logistics Technology News, dated Sep. 12, 1997, vol. 2, No. 15, titled "*FedEx Rolls Out Dimensioning System Based on Machine Vision*".

\* cited by examiner

SYSTEM AND METHOD FOR DIMENSIONING OBJECTS

CROSS REFERENCE TO RELATED APPLICATION

The present application claims priority from U.S. Provisional Application No. 60/128,079, filed Apr. 7, 1999, and U.S. Provisional Application No. 60/151,620, filed Aug. 31, 1999, which are expressly incorporated herein by reference.

BACKGROUND OF THE INVENTION

A. Field of the Invention

The present invention relates to systems and methods for determining the dimensions of an object.

B. Description of Related Art

In systems that operate on large numbers of objects, it has been known to use imaging devices connected to a computer systems to automatically determine the characteristics of the objects. Uses of such systems include quality assurance visual inspection systems. In the manufacturing industry such systems are utilized to detect defects in the items being produced. The use of the automated defect detection systems compares the products being scanned against the desired characteristics to determine if the items being produced fall within allowable tolerances.

Another industry where such automated object characterization systems have become known is the package shipping industry. Packages are provided, for example, with bar codes, wherein various types of bar code scanners are used to read the bar code applied to a parcel. By decoding the information provided in the bar code, a computer connected to the bar code reader can determine, for example, the address to which the parcel is to be shipped. Such information can be used, for example, to route the package to the proper destination.

System have also been used to determine the dimensional weight of packages being shipped. Traditionally, shipping charges were determined based on the weight of a package handled by a shipper. The determination of shipping rates based solely on weight, however, leads to inefficiencies where, for example, the shipping charge for a large package containing lightweight articles fails to compensate the shipper for the volume taken by the package. By determining the dimensions of objects, shippers can allocate space more efficiently and charge rates that more accurately reflect the resources used. A number of systems have been used to automatically determine the dimensions of packages being shipped. Patent Cooperation Treaty No. WO99/49411 teaches the use of two light showers (linear arrays of sight sources opposed by linear arrays of light sensors) placed perpendicularly. The package dimensions are determined by analyzing the portion of each light shower that is blocked by the package. U.S. Pat. No. 5,815,274 for VOLUMETRIC MEASUREMENT OF A PARCEL USING A CCD LINE SCANNER AND HEIGHT SENSOR issued Feb. 17, 1998 to Reynolds et al. discloses a method of dimensioning using a linear CCD scanner positioned over a conveyor belt to determine the width and length of a parcel and a height scanner positioned adjacent to the belt to determine the height of the parcel. The height sensor projects light toward the parcel and receives light not blocked by the parcel at the other side to determine the height.

SUMMARY OF THE INVENTION

An object of the invention is to provide efficient access to the increasing volume of information available about a parcel being shipped. A further object is to utilize human intervention in conjunction with computer determined information in order to increase the reliability of the information utilized to characterize parcels being shipped.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, a first embodiment of the invention comprises a system for capturing information about objects moving along an object transport system and includes an object dimensioning system for producing object dimension information for the objects, an object identification system for producing object identification information for the objects, and an image capture system for producing electronic images of the objects.

In a second embodiment of the invention an inter-facility system for capturing, storing, and accessing object information obtained from at least two object processing facilities is described and includes at least one object information capture system located at each facility for capturing information about objects being processed, a server located at each facility for storing the information about the objects being processed at that facility, an index server for identifying the facility at which the information associated with each object is stored.

In a third embodiment of the invention a method of recovering revenue based on dimensional weight is described as including steps of capturing information about the shape of an object, processing the captured information to provide a three dimensional model of the of the object, calculating a dimensional confidence value based on the three dimensional model of the object, capturing an image of the object, displaying, if the dimensional confidence value is below a threshold value, the model of the object and the image of the object to a human operator to confirm the fit of the model to the object, and accepting the three dimensional model or not based on an indication from the human operator.

It is to be understood that both the foregoing general description and the following detailed description are exemplary and explanatory only and are not restrictive of the invention, as claimed.

The accompanying drawings, which are incorporated in and constitute a part of this specification, illustrate the invention and together with the description, serve to explain the principles of the invention.

DETAILED DESCRIPTION OF THE INVENTION

Reference will now be made in detail to the present exemplary embodiment of the invention. Wherever possible, the same reference numbers will be used throughout the drawings to refer to the same or like parts.

The term "belt" is intended to encompass all package transport systems, including conveyors, ramps, gravity rollers, etc. In the following description "along the belt" means measurements in the direction of belt motion (i.e., in the longitudinal or x-direction of the belt's length). "Across the belt" means measurements perpendicular to the direction of belt motion (i.e., in the transverse or y-direction of belt width) as shown in FIG. 1.

Figure 1:
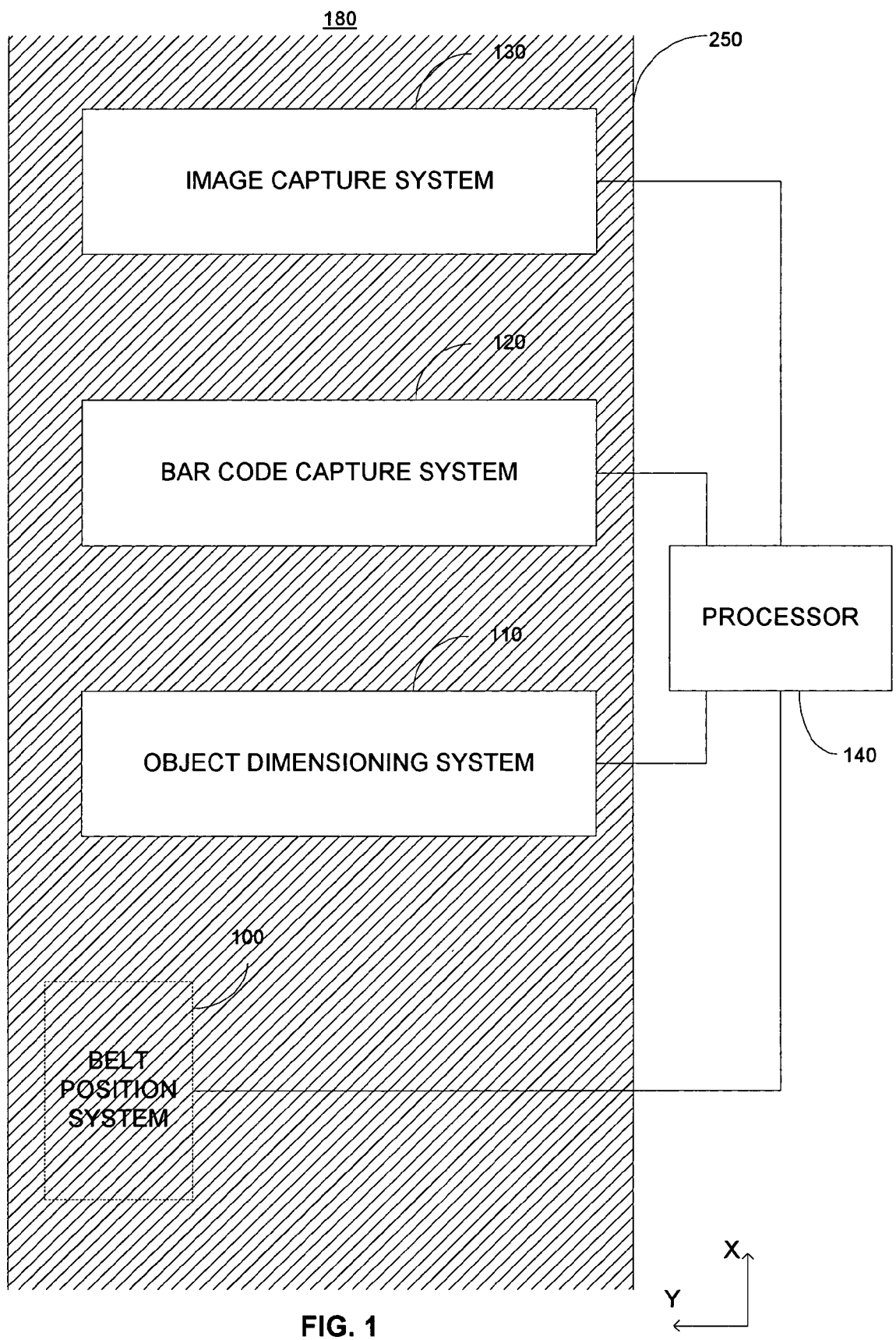
FIG. 1 is a block diagram of an exemplary parcel information capture system.

FIG. 1 shows an exemplary parcel information capture system 180 in accordance with a first aspect of the present invention.

Parcel information capture system 180 captures information about objects passing along belt 250. The information captured for each object may include the weight of the object, information encoded in a bar code on the object, the position of the bar code on the object, the position of the object on belt 250, an image of the object, and the dimensions of the object. In a preferred embodiment, weight information is obtained at a station other than the parcel information capture system. However, a scale operable while an object is in motion past the parcel information capture system 180 may be incorporated into the system in order to collect weight information.

In the embodiment shown in FIG. 1, the parcel information capture system 180 incorporates a belt position system 100, an object dimensioning system 110, a bar code capture system 120, an image capture system 130, and a processor 140. The relative positions of the information capture systems is exemplary only. The positions of the systems can be provided in any order along belt 250. Further, while parcel information capture system 180 is shown with a single processor 140, it is understood that more one processor may be used to provide processing capabilities to the various systems. Further, the individual data capture systems may incorporate their own processors.

The belt position system 100 provides belt position information to processor 140. The belt position information is used to determine a position along the belt 250. Such indication can be provided in the form of, for example, a specific x-position or a pulse indicating an incremental increase in position since the last pulse. The position information provided by belt position system 100 may also include information about the time at which the position information was captured. In a preferred embodiment processor 140 associates a time value with the position information from belt position system 100. Information determinable from the position information includes belt velocity and belt acceleration information. By determining belt position values for discrete points in time, processor 140 can accurately determine the position of belt 250 for any specific point in time. Further, by adopting the assumption that objects placed on belt 250 remain at approximately the same position on belt 250 as they pass parcel information capture system 180, the system can determine position values for objects using time stamp values associated with specific collected information.

Parcel information capture system 180 also incorporates an object dimensioning system 110. Such systems provide information about the length, width, and height of an object. The systems operate by, for example, projecting sonic or electromagnetic energy onto the object. The systems also incorporate detection systems. The detection systems generally receive either energy reflected from the surface of the object or energy that was not blocked by the surface of the object. The systems that detect reflected energy operate, for example, using principles similar to cameras or radar systems. The systems that detect energy that is not blocked by the surface of the object, for example, a light shower, operate using a two dimensional array of energy sources on one side of the object and a two dimensional array of energy sensors on the opposite side of the object. The dimensions of the object can be determined in view of the portion of the array of those energy sensors that do not receive the transmitted energy.

The dimensioning systems generally do not provide information about the entire object at a given time. Instead, information is captured about the object as the object travels along belt 250 past the object dimensioning system 110 and is sent to processor 140. By associating a belt position value from the belt position information with the data captured at a given time, the processor can build a three dimensional model of the object using the dimensional information captured. For example, the system may determine that at time 1 the height of the object is $z_1$, at time 2 the height is $z_2$, at time 3 the height is $z_3$. By associating each of these sampled values with positions along the object, the height value along the object can be modeled.

This information can also be used to place the model of an object in the proper position and orientation on the belt. Multiples object may be modeled, such that the relative positions of the objects can also be modeled. In a preferred embodiment, three dimensional models of each of the objects on the belt are created.

Parcel information capture system 180 also includes a bar code capture system. Because the bar code on an object being scanned may be in any orientation about the object, the system operates using a plurality of bar code reading laser beams that are scanned across the object in different orientations relative to the object. The information from the dimensioning system, if collected prior to the use of the bar code capture system, can be used to focus the bar code capture system at the proper distance. In the preferred embodiment, the bar code capture system 120 is, therefore, provided down belt from the object dimensioning system 110.

Further, if the position across the belt of the object is determined by the object dimensioning system 110, the different bar code readers can be separately focused in order to provide proper scanning depth for simultaneously scanning different objects having different heights simultaneously passing the bar code readers. Further, by determining the orientation of a scanning beam that scans a bar code on an object passing the bar code capture system 120, the position in space of the bar code relative to the source of the beam can be determined. Specifically, the beam produced by the bar code scanner travels a specific known angular trajectory in space. By determining the time at which the bar code scanner scanned a bar code, the portion of the beam trajectory encompassed by the bar code can be determined. This information can be combined with the information captured by the object dimensioning system 110, i.e., the bar code scanning beam subtended a determinable angular position in space relative to the bar code scanner. The angular position can be mapped onto the three dimensional model of the objects moving across the belt by correcting for the difference in time using the known change in position of the belt 250 during the time between the capture of the dimensional information and the capture of the bar code information. By combining the determined angular position in space from the bar code information with the three dimensional model produced from the dimensional information, the bar code information scanned can be associated with the proper object.

Because objects may be defined by the bar code information associated with the object, by correlating dimensional information of an object with bar code information of an object, the system is able to associate in memory the proper dimensional information with the proper object.

Parcel information capture system 180 also incorporates an image capture system 130. Image capture system 130 provides image information about objects passing parcel information capture system 180. The image information may be, for example, a black and white or color image of belt 250 and the objects thereon produced using an array of charged coupled devices (CCDs). As with the information provided by the belt position system 100, object dimensioning system 110, and bar code capture system 120, the information provided by the image capture system is associated with the time at which it is captured. By determining a time difference between the capture of information by the object dimensioning system 110, bar code capture system 120, and image capture system 130, and using the information about the position of the object on the belt as determined by the object dimensioning system, the image information provided by the image capture system 130 can be associated with a particular object. Specifically, if it is known that the image capture system is ten feet down belt 250 from object dimensioning system 110, and the time necessary for an object to traverse the 10 feet is determined using the velocity of the belt, then image information captured at the determined time relative to the captured dimension information will provide an image of the object dimensioned by the object dimensioning system 110.

The parcel information capture system 180 also incorporates a processor 140. As discussed above, the designation of a single processor 140 is exemplary only. Each information capture system may incorporate a processor. The processor 140 is provided to derive information from the data provided by each of the information capture systems. The processor is also used to associate the information provided by each of the systems with the other gathered information so that the dimension information, bar code information, and image information determined from a specific object can be associated together.

Figure 2:
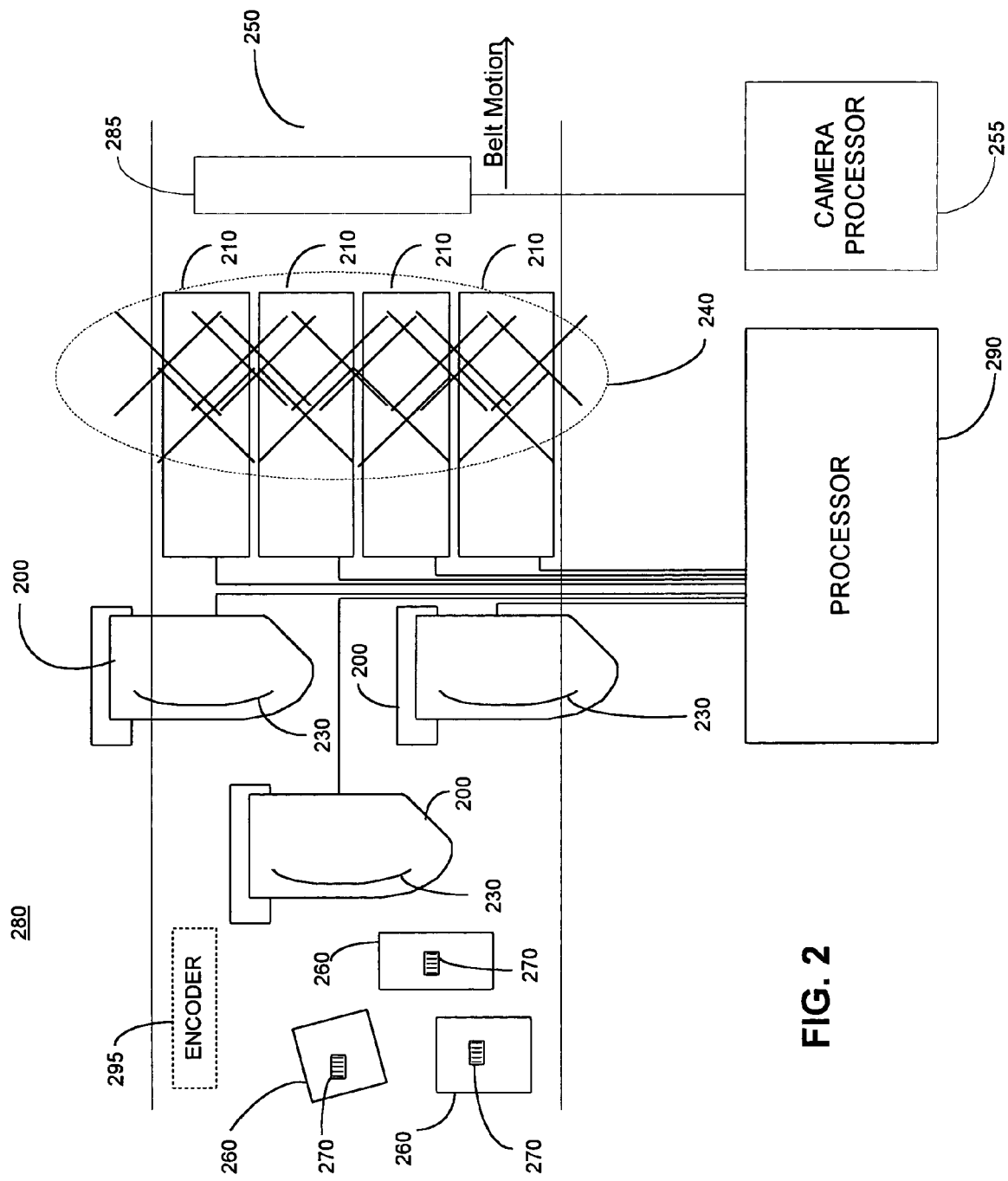
FIG. 2 is a block diagram of a presently preferred embodiment of a parcel information capture system.

A presently preferred embodiment of the parcel information capture system 180 of FIG. 1 is shown as parcel information capture system 280 in FIG. 2. Parcel information capture system 280 is shown as incorporating vertical dimensioning scanners 200 projecting dimensioning scanning beam patterns 230, bar code scanners 210 projecting bar code scanning beam patterns 240, belt 250, parcels 260 having bar codes 270 thereon, camera 285, object information processor 290, camera processor 255, and encoder 295.

Encoder 295 is used to correctly determine position along conveyor belt 250. Using the captured position of the belt at a specific time, and correlating that position with a time stamp value associated with the capture of information from an object, the time stamp value can be used to provide a correlation between the object and information captured about the object. The motion of belt 250 is measured using the encoder 295, which is, for example, a shaft encoder connected to a roller (not shown) on conveyor belt 250. When belt 250 moves the roller turns and shaft encoder 295 turns with it. For each small angle of motion in shaft encoder 295 an electrical pulse is produced. This electrical pulse can be sent, for example, to object information processor 290 to determine the position of the belt at a given time. The position determination is made by, for example, counting the number of pulses received. The number of pulses is translated into distance using a known translation between distance and rotational motion of the shaft connected to the encoder. By querying a position determining process within object information processor 290 at a given time, the position value of the belt at that time can be determined.

The dimensioning system is shown in the embodiment of FIG. 2 as three vertical dimensioning scanners 200 located above belt 250. The number of scanners provided is determined in view of the requirement that the entire width of belt 250 is preferably scanned by the combined action of the scanners. The dimensioning scanners 200 are used to determine the height of objects on belt 250 at specific positions across belt 250 scanned by dimensioning scanners 200.

Figure 3:
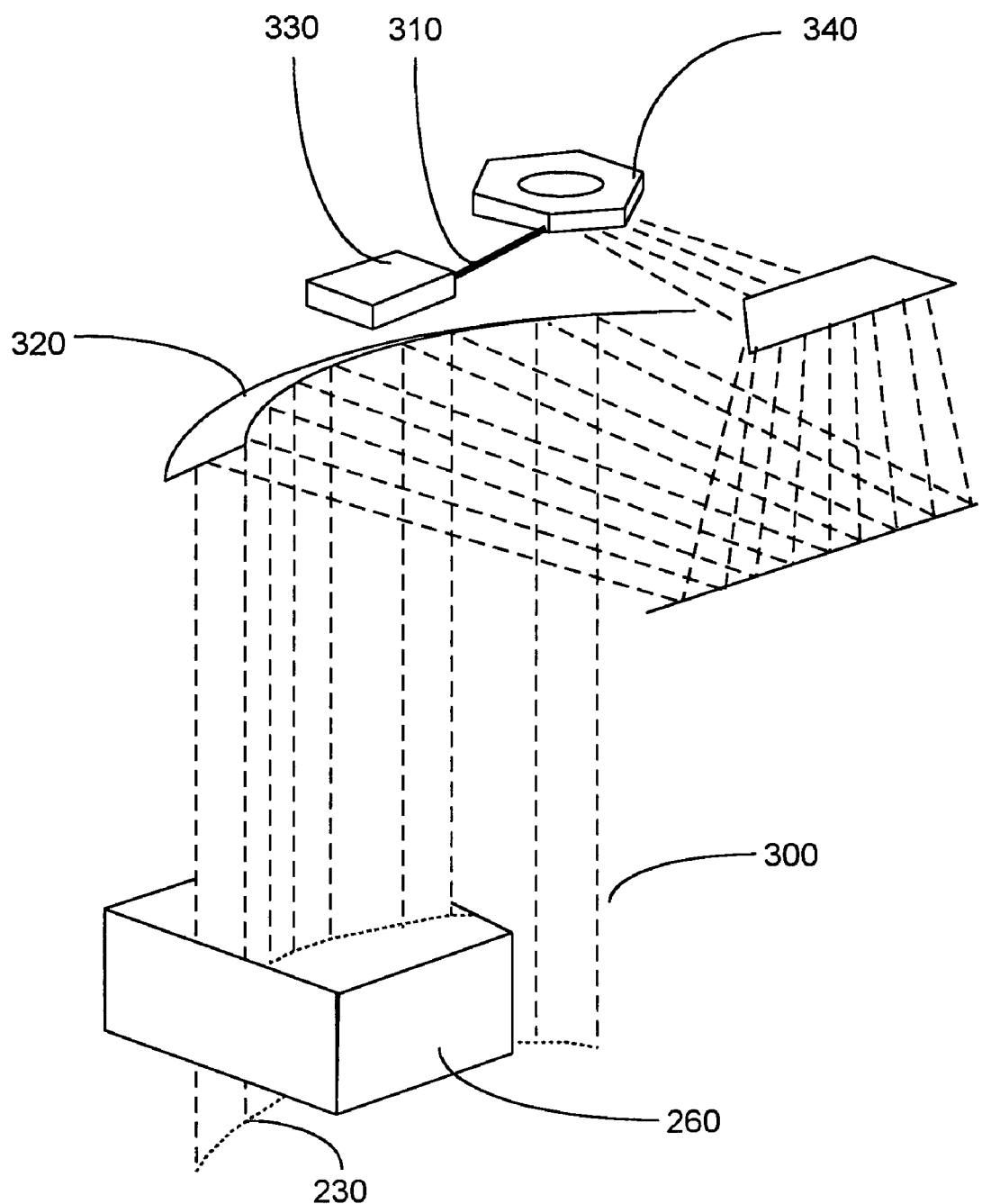
FIG. 3 is a diagram of an exemplary vertical dimensional scanner.

FIG. 3 shows a detailed view of an exemplary vertical dimensioning scanner 200. Vertical dimensioning scanner 200 includes a beam source 330 for producing a beam 310. The beam is reflected by a rotating beam reflector 340 creating a scanning beam, which is projected downward from parabolic mirror 320 onto the a parcel 260. The elements together provide a curved vertical shower of light 300 which projects in a curved pattern 230 across parcel 260 and belt 250. In the presently preferred embodiment the beam source is a laser. The curved pattern 230 is reflected from the surface of parcels 230 and belt 250 onto a detector (not shown).

The operation of the system at a given point in time functions such that a point on the object is illuminated by the projection of beam 310 onto the object. The reflection of the light from that point is captured by the detector. The distance that the light traveled between its emission from the source 330 and its capture by the detector is determined using known laser radar (ladar) distance measurement techniques.

The three vertical dimensioning scanners 200 together provide complete coverage of belt 250. Any overlap between the vertical dimensioning scanners 200 across the belt can be accounted for by, for example, discarding the height information provided by one of the scanners in the overlapping range. Each scan provided by the vertical dimension scanner provides information about the height of all objects across the belt for the segment of the belt covered by that vertical dimensioning scanner. Because the vertical dimensioning scanners need not be placed at the same position down the belt, the information provided by the scanners is time adjusted such that scans of the same position down the belt by the different scanners are properly correlated with each other.

The vertical dimensioning scanners 200, therefore, provide information about the height of all of the objects at a specific cross section down belt. By combining the captured information from the vertical dimensioning scanners 200 over time, height information of all objects on the belt can be captured and added to a height image of belt 250 and the objects thereon.

The raw height information received by vertical dimensioning scanners is preferably simplified by providing data concerning the outline of the parcel. Specifically, the data corresponding to the top of a flat rectangular parcel would incorporate a great number of height information points from the top surface of the object. Where different points are similar height, they may be incorporated together into a line. Instead of being characterized by a plurality of points, the line is characterized by the three dimensional coordinates of its end points.

Further, lines at similar heights may be incorporated into a surface that characterizes that portion of the top surface of the object being scanned. The surface may be characterized by the lines that make up the border of the surface, such that, for example, a rectangular parcel can be represented by the four three-dimensional point coordinates of the corners of the top surface. A circular parcel could be modeled as a circle having a specific radius. The more complicated the shape the more point coordinates are required to model the top surface of the object. The use of three dimensional points provides information about the position of the object in space.

Further, using the information about the top surface of an object, the information can be fitted to models of objects stored in memory. For example, a model of a tire would be, for example, an outer circle with an inner circle centered within the outer circle. Using the model as the basis, the system can determine how well the object fits the definition of the model. For example, a model of a rectangular parcel requires that the top surface is comprised of four straight lines. If the lines that make up the top surface are not straight, upon fitting the model to the shape, object information processor 290 can determine the deviation of the shape from the closest model shape, called the model fit. A geometric or statistical interpretation of the data may also be performed.

Figure 4:
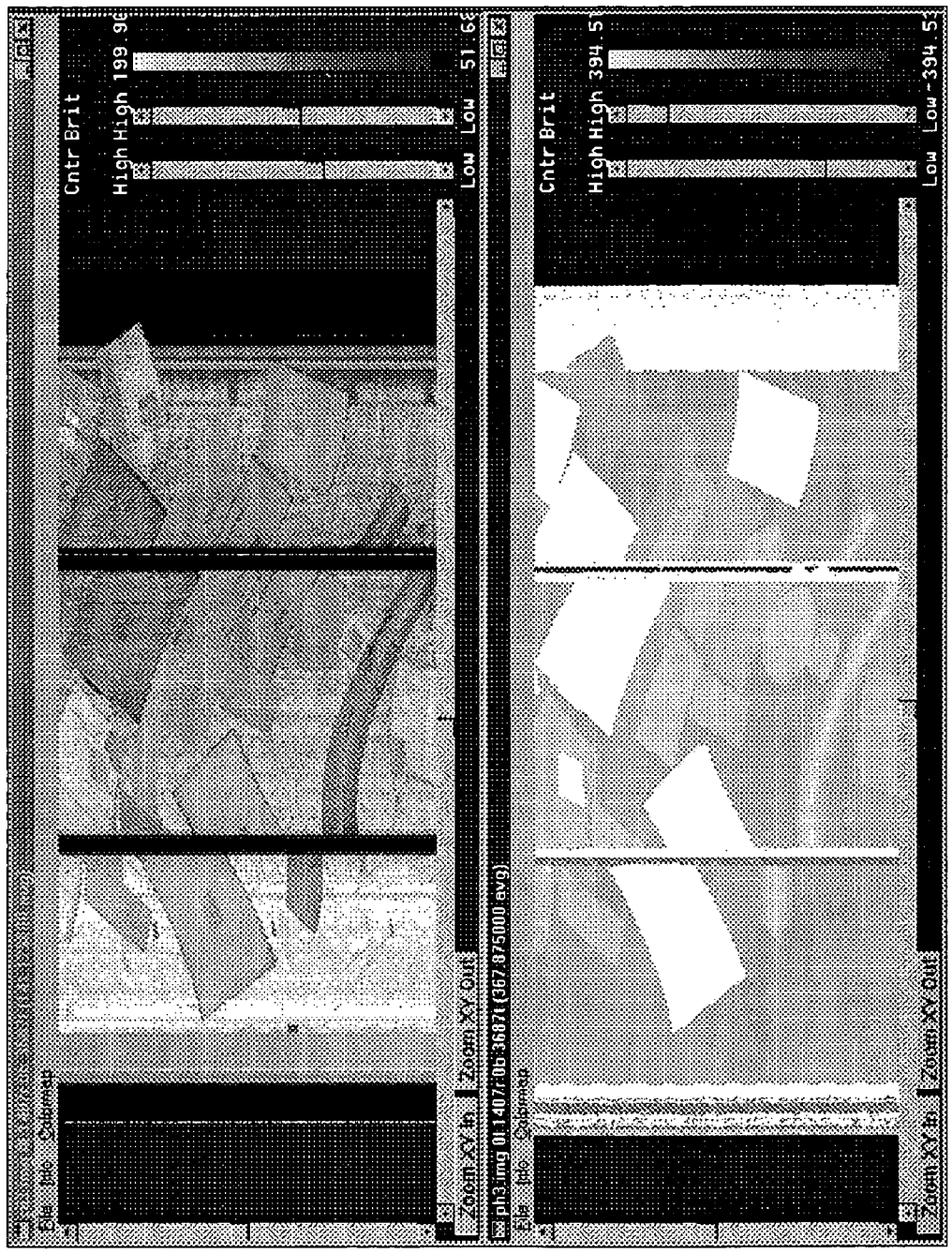
FIG. 4 shows two exemplary graphical representations of processed data from a vertical dimensional scanner.

FIG. 4 illustrates intensity-coded images of parcels and height contour data. These images incorporate the information provided by the three vertical dimensioning scanners 200, whereby the information from the vertical dimensioning scanners 200 is combined together and systematic data transformations have been performed. The left image 710 and right image 720 are intensity and height images, respectively.

Bar code scanners 210 are used across the conveyor belt 250 to read bar codes 270 located on parcels 260. Bar code scanning of multiple bar codes 270 can be performed across the belt simultaneously, including multiple bar codes 270 that may be placed on a single parcel. In a preferred embodiment, bar code scanners 210 can be focused separately. The ability to focus bar code scanners 210 separately permits the parcel characterization system 280 to read narrower bar code line widths over a wider range of parcel heights than can conventional fixed focus systems. Bar code scanners 210 are arranged across the belt 250 to project a total of, for example, 12 pairs of intersecting "X" patterns of scanning beams 240 on belt 250, thereby reading bar codes 270 across multiple "zones." In this way there is complete coverage of objects disposed on belt 250 by bar code scanners 210. The information derived from the scanning process of bar code scanners 210 is transmitted to object information processor 290. Alternatively a processor dedicated to the bar code scanners 210 can be used to process the bar code information.

Figure 5:
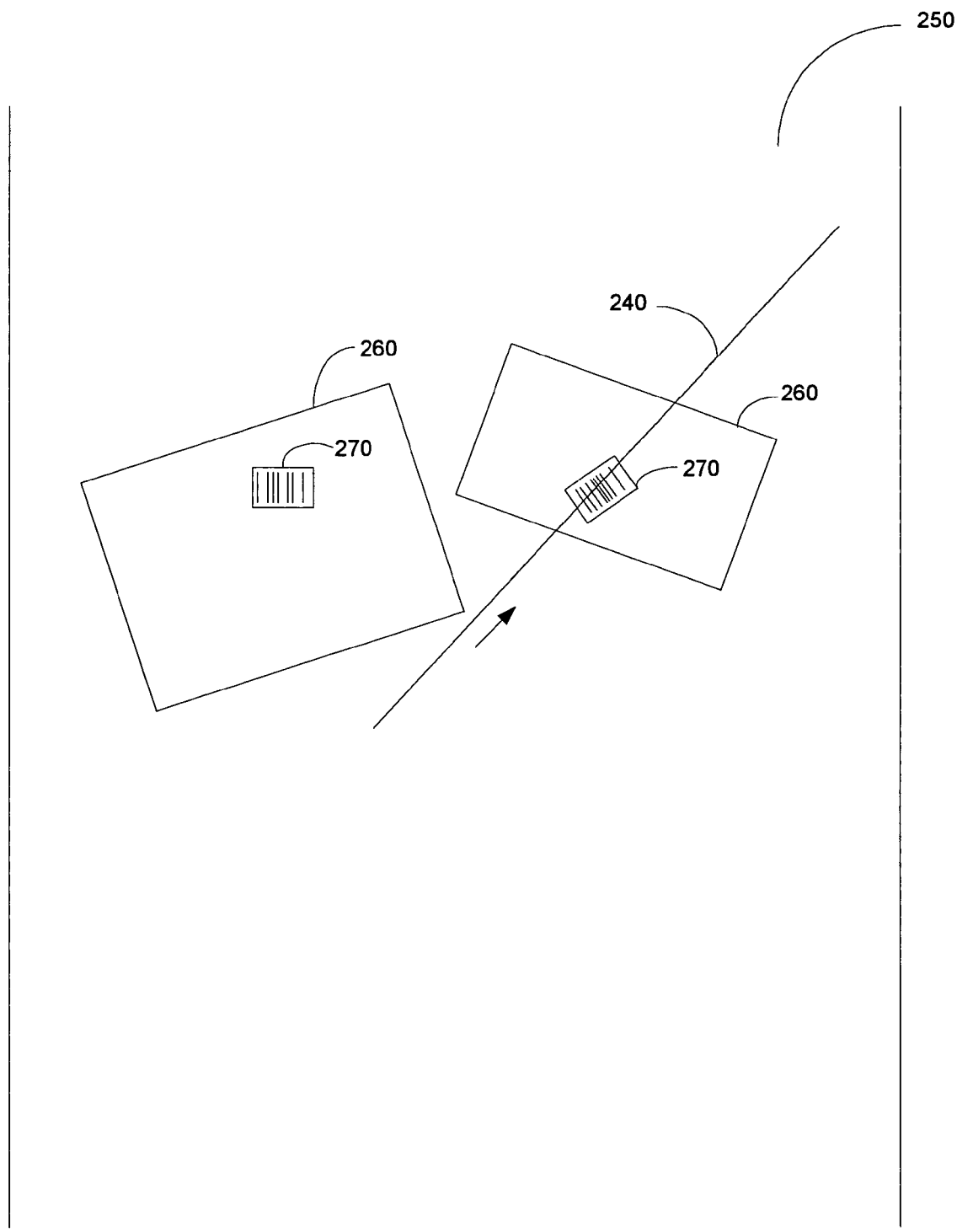
FIG. 5 shows a graphical representation of the operation of a bar code scanner as seen from above a parcel transport system.
Figure 6:
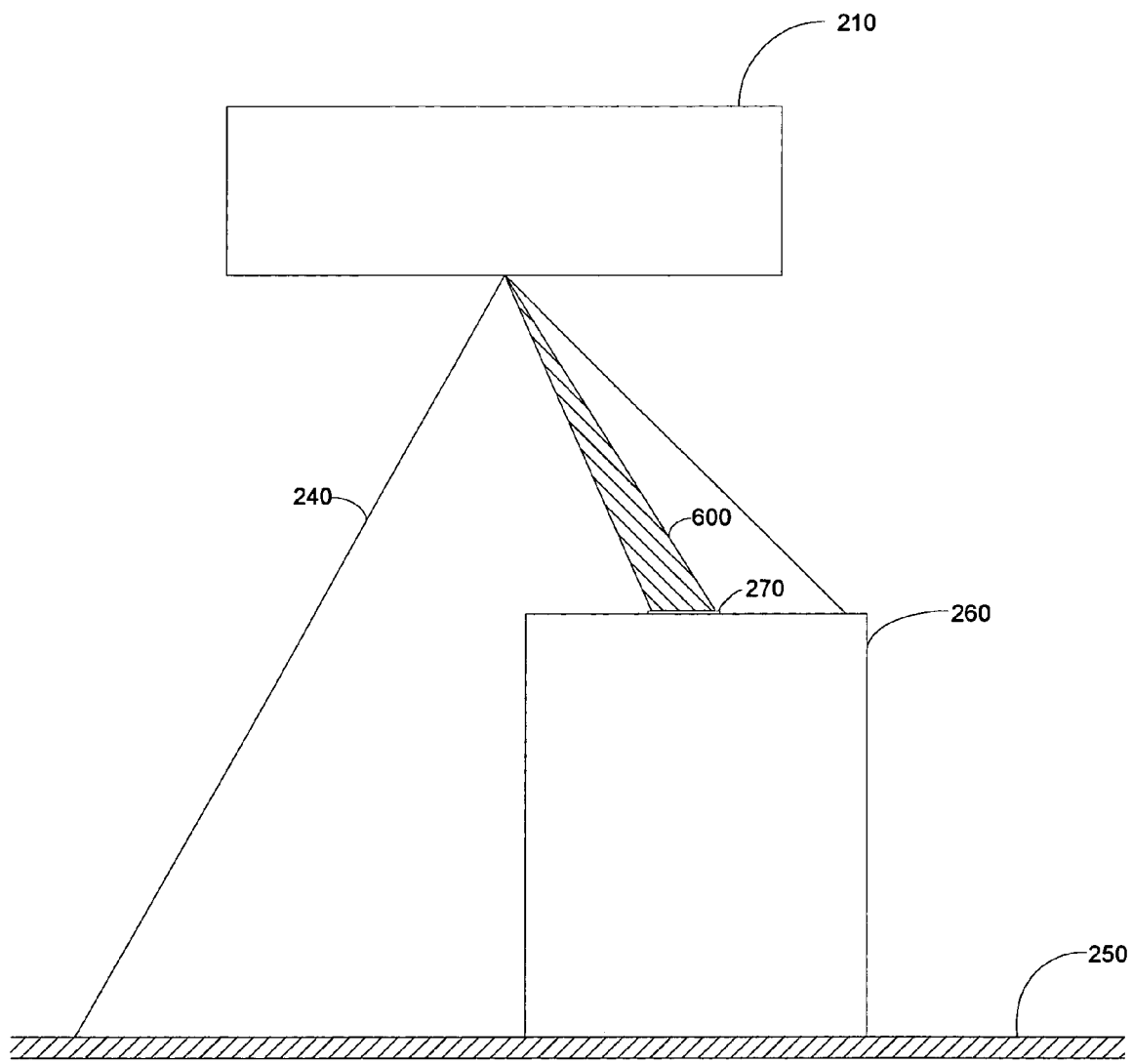
FIG. 6 shows a graphical representation of the operation of a bar code scanner as seen from the side of a parcel transport system.

Position information relating to a bar code may also be determined using a bar code scanner 210. As shown in FIG. 5, scanner 210 produces a beam that traverses a known path 240 across belt 250 (not shown in FIG. 5), parcel 260, and bar code 270. A detector associated with the scanner 210 receives the reflection from the surface scanned. As is known in the art, the intensity information provided by the detected signal is translatable into the bar code information encoded in the bar code on the parcel. As shown in FIG. 6, by determining, from the intensity signal provided by the detector, when the beam traverses the bar code 270, an angular portion of the path 240 traversed by the beam produced by bar code scanner 210 can be determined. Using the information provided by the known path, the system can determine the position across the belt at which the bar code is located. Further, by associating the time of capture of the information with the position information provided by belt position system 100, object information processor 290 can determine the position along the belt at which the bar code was located at the time of capture. The translation of this information into the time frame of the dimensional information provided by the dimensioning system can be used to associate the bar code information with the proper dimensional information of parcel 260.

The preferred parcel information capture system 280 further includes an image capture system 150. Image capture system 130 of FIG. 1 is shown in FIG. 2 as a camera 285. The term "camera" is intended to encompass all systems capable of providing an analog or digital signal representative of objects within the field of view of the imaging device. For analog cameras, the analog signal may be translated into a digital signal as part of the processing of the signal. In a preferred embodiment the camera is a digital camera operating using an array of charged coupled devices (CCDs). The array of charge coupled devices is either a linear array encompassing the width of the belt or a two dimensional array capable of imaging the width of the belt. Alternatively, separate cameras may be employed to ensure full coverage of the width of the belt surface.

In a preferred implementation, the image information acquired by camera 285 is provided to camera processor 225, which processes the image information provided by camera 285. The processing may include adding a time stamp to the image and/or translating the image into another format. In a preferred implementation, camera processor 255 translates the image into a compressed image format such as JPEG. Using the time stamp information the image information can be associated with positional information along the belt as provided by encoder 295. Preferably camera 285 is provided looking downward at the belt at an angle in order to provide a view encompassing the top and at least one side surface of the objects passing through parcel information capture system 280.

In a preferred embodiment, camera 285 employs a two dimensional array of charged coupled device elements to provide time stamped images of the belt and items on the belt. The image of belt 250 is a "snap shot" of the condition of belt 250 at the time the image is captured. The image may contain sufficient detail to provide information about printed and/or handwritten information on the object. Processing on the image can be performed to locate and identify such information. Using the time stamp associated with each image, the image may be electronically associated with the other information acquired from the parcels present in the camera's field of view at that time.

Additional sensor devices may be provided as part of parcel information capture system. For example, a thermometer may be provided to provide time stamped temperature information. Using the time at which the temperature information is captured, the temperature information may be associated with a parcel. The system may also be provided with chemical analyzers to provide a chemical signature of object passing through the parcel information capture system 280.

The information captured by parcel information capture system 280 can be presented as an image and/or as a list of coordinates representing one or several objects that have passed through the parcel information capture system 280. The information can be separated into different categories. A first category is image information about an object. It consists of one or several time-stamped images of the object. One image may contain representations of several objects. Objects within the image may be identified by the timestamp associated with the image or by visual attributes of the imaged object. The image may contain printed and/or handwritten information from the object. A second category of information provides a description of the object and its surroundings. Attributes from this second category include, but are not limited to, a list of points representing the object (i.e., points that define the boundary of the top surface to define the object), the position in space of the object, the dimensions of the object, the fit of the point definition of the object to a model from memory, geometric and statistical interpretations of the data, temperature, date and time, chemical signature, and bar code information.

A number of different types of information, therefore, are available about object that pass a parcel information capture system 280. Because each parcel has a specific identification code provided by a bar code or other identifier placed on the parcel, all of this information can be electronically associated together with the parcel identifying code as the associating information. All of the information is identifiable by the parcel identification code associated with each parcel.

Figure 7:
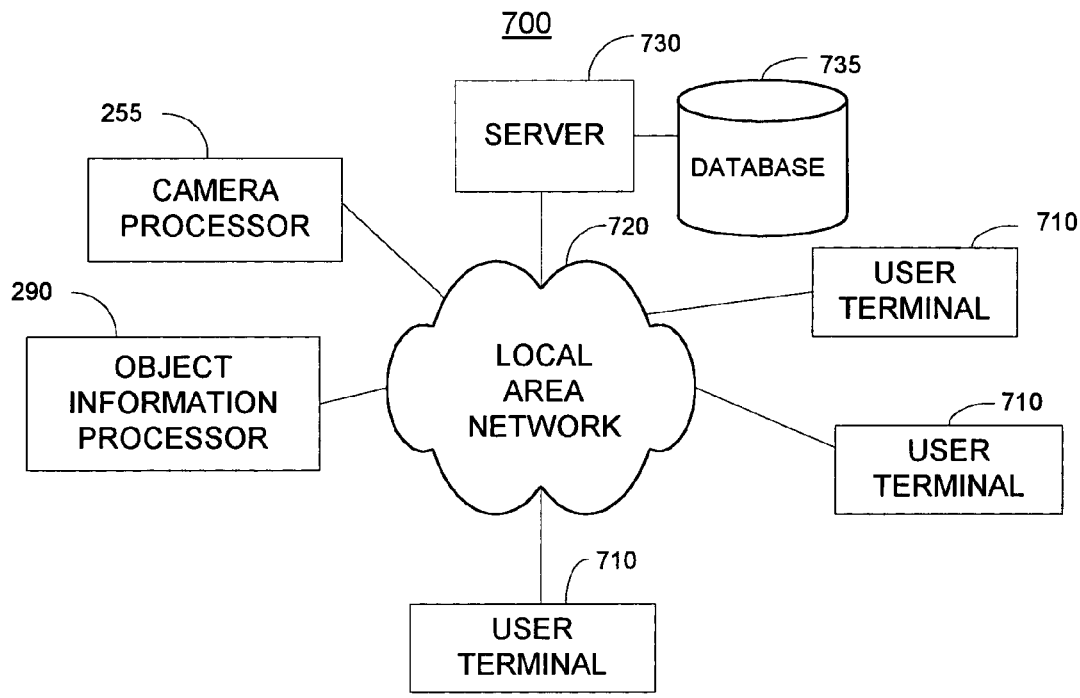
FIG. 7 is a block diagram of an exemplary system configuration for a single facility server system.

FIG. 7 is a diagram of a basic system configuration for a single-facility server system 700. The term "facility" is intended to encompass parcel processing facilities such as parcel sorting facilities. Server system 700 includes a server 730 connected to a database 735, a camera processor 255, an object information processor 290, a local area network 720, and a user terminal 710.

Camera processor 255 and object information processor 290 are as described above with respect to FIG. 2. The time stamped data processed by object information processor 290 and camera processor 255 is transmitted over network 720 to a server 730. Network 720 is shown as a local area network (LAN). However, a wide area network (WAN) or other network configuration may also be used. Server 730 stores the information in memory, shown as a database 735. In a preferred embodiment, an object information client application running on object information processor 290 forwards the time-stamped information over network 720 to a object information server application running on server 730. The object information server application stores the data in database 735 using the time stamp and a parcel identifier, such as the bar code read from the parcel, as identifiers of the captured information. Similarly, an image capture client application running on camera processor 255 forwards the time stamped image information over network 720 to an image capture server application running on server 730. The image capture server application stores the data in database 735 using the time stamp identification information. Using the time stamp applied to both sets of information, and calibrating for any time differences in capture time due to differing locations along belt 250, the two streams of information can be correlated within database 735 by server 730.

Single facility-server system 700 also incorporates a plurality of user terminals 710. User terminals 710 are able to access information from database 735 via network 720 and server 730. User terminals are, for example, personal computers or any other device capable of accessing electronic information and displaying the information to a user. In a preferred embodiment a web based client application runs on user terminal 710.

Figure 8:
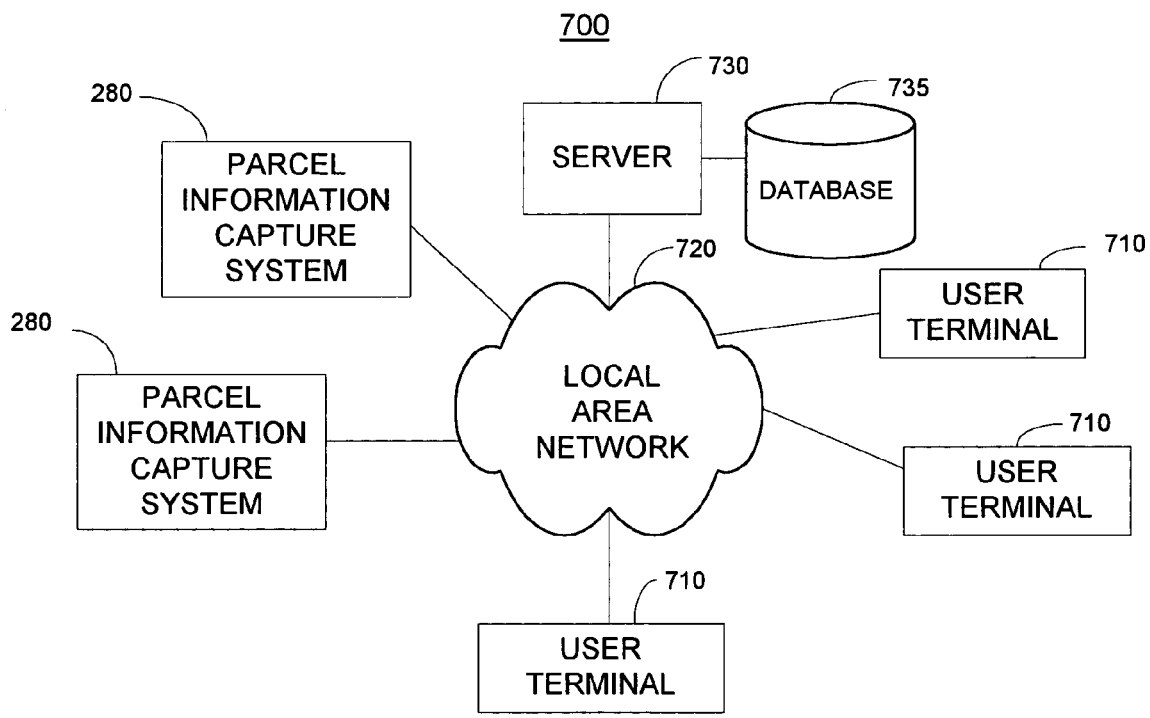
FIG. 8 is a block diagram of an exemplary system configuration for a single facility having more than one parcel information capture system.

In many implementations of the present invention, more than one parcel information capture system 280 would be employed for a single parcel processing facility. FIG. 8 shows a diagram of a single facility having more than one parcel information capture system 280. As shown in FIG. 8, a single server 730 and database 735 may be used to store and access the information provided by multiple parcel information capture systems 280. By utilizing a single server 730 for a facility, the data collected from multiple parcel information capture systems 280 and stored in database 735 may be easily accessed via user terminal 710.

Figure 9:
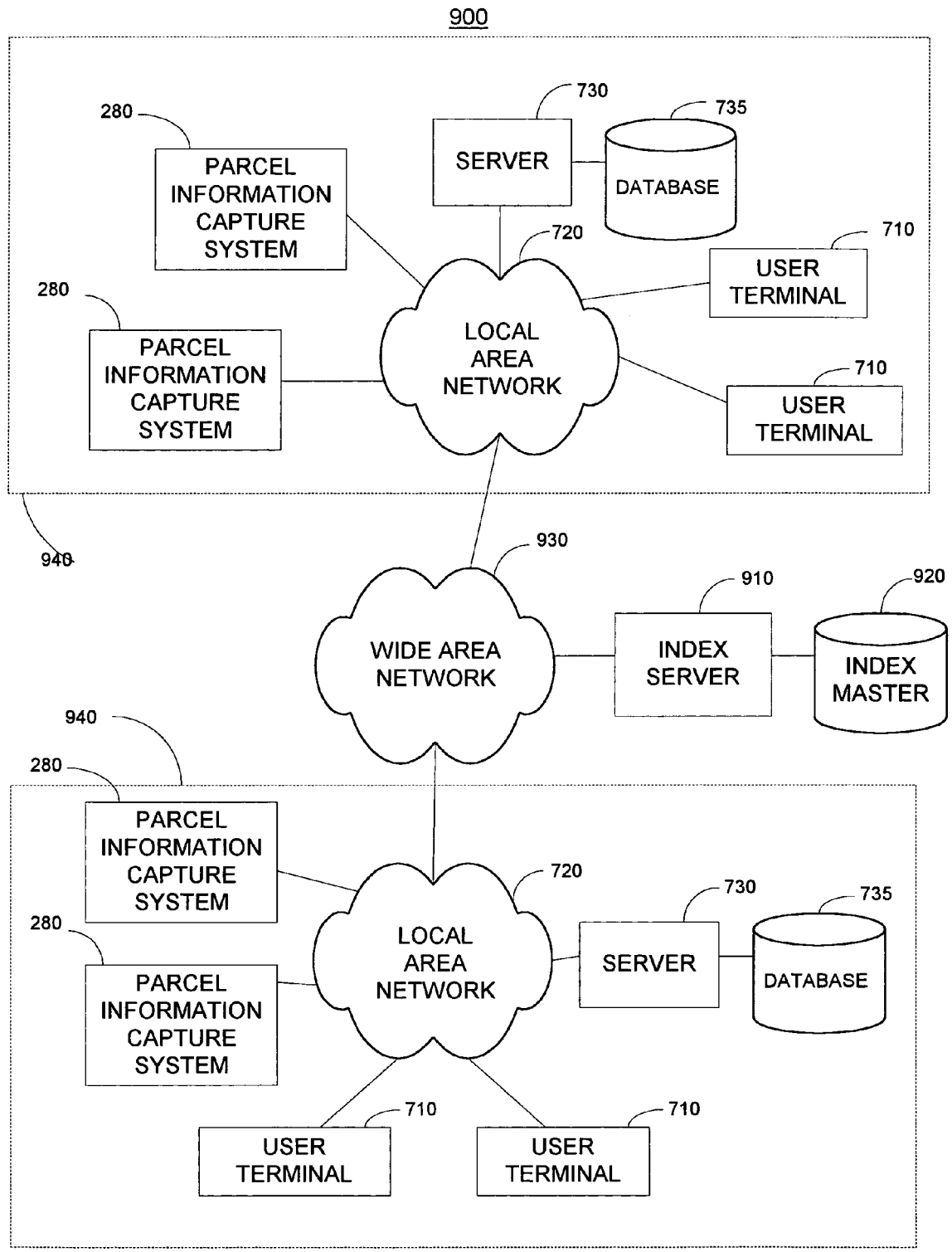
FIG. 9 is a block diagram of an exemplary system configuration for multiple facilities each having parcel information capture systems.

FIG. 9 is a diagram of an implementation of the present invention for use in a system encompassing multiple facilities. Two facilities 940 are shown in FIG. 9, although any number of facilities may be used in accordance with the present invention. Facilities 940 are each shown having two parcel information capture systems 280. However, any number of parcel information capture systems may be employed at a facility 940. As in FIGS. 7 and 8, the elements found at the individual facilities 940 are shown as connected together by local area networks 720. Facilities 940 are also shown as being connected together by a wide area network 930. Wide area network 930 may be, for example, the Internet or other suitable network configuration. Connected to wide area network 930 is an index server 910 and an index master database 920. Index server 910 and index master database 920 may be provided within a facility 940.

Index master database is a central source of information used to locate information stored on the multiple databases 735 within the multiple facilities 940. Specifically, a user attempting to locate information about a specific parcel will not necessarily know which facility 940 through which the parcel was processed. The index master database stores data corresponding to each parcel processed by the multiple parcel information capture systems 280. The information may include a parcel identification number such as a bar code or tracking number, the data and time that the information was captured, and a code identifying which parcel information capture system 280 captured the information. The index master database may also store information about a third party associated with the parcel, such as the party who shipped the parcel or the party who is to receive the parcel. When a user requests information via a user terminal 710 about a specific object, the request is received by server 910, which runs a search against the index master database 920 to determine which database 735 contains the record-specific information. The server 910 returns the results of the request to the user terminal 710, which then sends a request to the specific server 730 having access to the information stored in the database 735. Server 730 accesses the requested information and forwards it to user terminal 710. The steps required to access the information are transparent to the user after the object specific query has been initiated.

Two basic data access paradigms are available to user terminal 710, "pull" and "push."

The process of pushing data to the user is provided by a "push" process application running on server 730. As the information provided by object information processor 290 and/or camera processor 255 is provided to server 730, the push process application analyzes the data to determine if the attributes assigned to a given object meet predefined object characteristics. If the attributes meet the predefined object characteristics, the information acquired about the object is automatically forwarded to a user terminal 710.

The push process may be used, for example, to capture incremental dimensional revenue by improving the ability of the system to determine the proper dimensional weight of objects being processed. Parcel information capture systems 280 operating to determine dimensional information about objects apply shape models to the dimensional information obtained. A parcel information capture system will, for example, attempt to apply definitions such as cuboidal or cylindrical to each object that is processed.

General practice in the shipping industry for recovering revenue from dimensional weight is to calculate dimensional weight based on the smallest enclosing rectangle for irregular object shapes. A calculated goodness or comfort level of the best model fit and measurement is combined in a value called the dimensional confidence. The idea of the dimensional confidence is to apply a numerical value to the likelihood that the measured dimensions in fact conform to the object's actual dimensions. If, for example, a parcel cannot be defined with a certain approximation as a cuboidal or cylindrical object or any other defined object definition, a low dimensional confidence will be calculated. Further, if there are irregularities along an edge of the object, i.e., if the approximation of the edge of the object as a line falls outside a given statistical value, a low dimensional confidence will be assigned.

By assigning a low dimensional confidence, the system will not apply the calculated dimensional weight in charging the client for the extra dimensional weight, i.e., if the dimensional confidence is below a set threshold, the calculated dimensional weight would generally be ignored in order to avoid overcharging the client. In order to supplement the dimensional measurements of the parcel information capture systems 280, therefore, pattern recognition abilities of human users may be added. A user having access to the image and dimensional information captured by a parcel information capture system 280 may compare the calculated dimensions against a captured image of the object to determine if the parcel information capture system 280 has incorrectly assigned a low dimensional confidence value to the record. The operator may also calculate the dimensions of the object by different method such as applying a least enclosing rectangle method to the visual information provided.

The push model of data acquisition is applied to the above principle, in that only those objects having a dimensional confidence below a set threshold are selected as proper targets for review by a human user. The records may, for example, be reviewed by server 730 as they are being stored in database 735, and those records having a dimensional confidence below the level beyond which the dimensional information would otherwise not be applied will be pushed to a user located at a user terminal 710.

Figure 10:
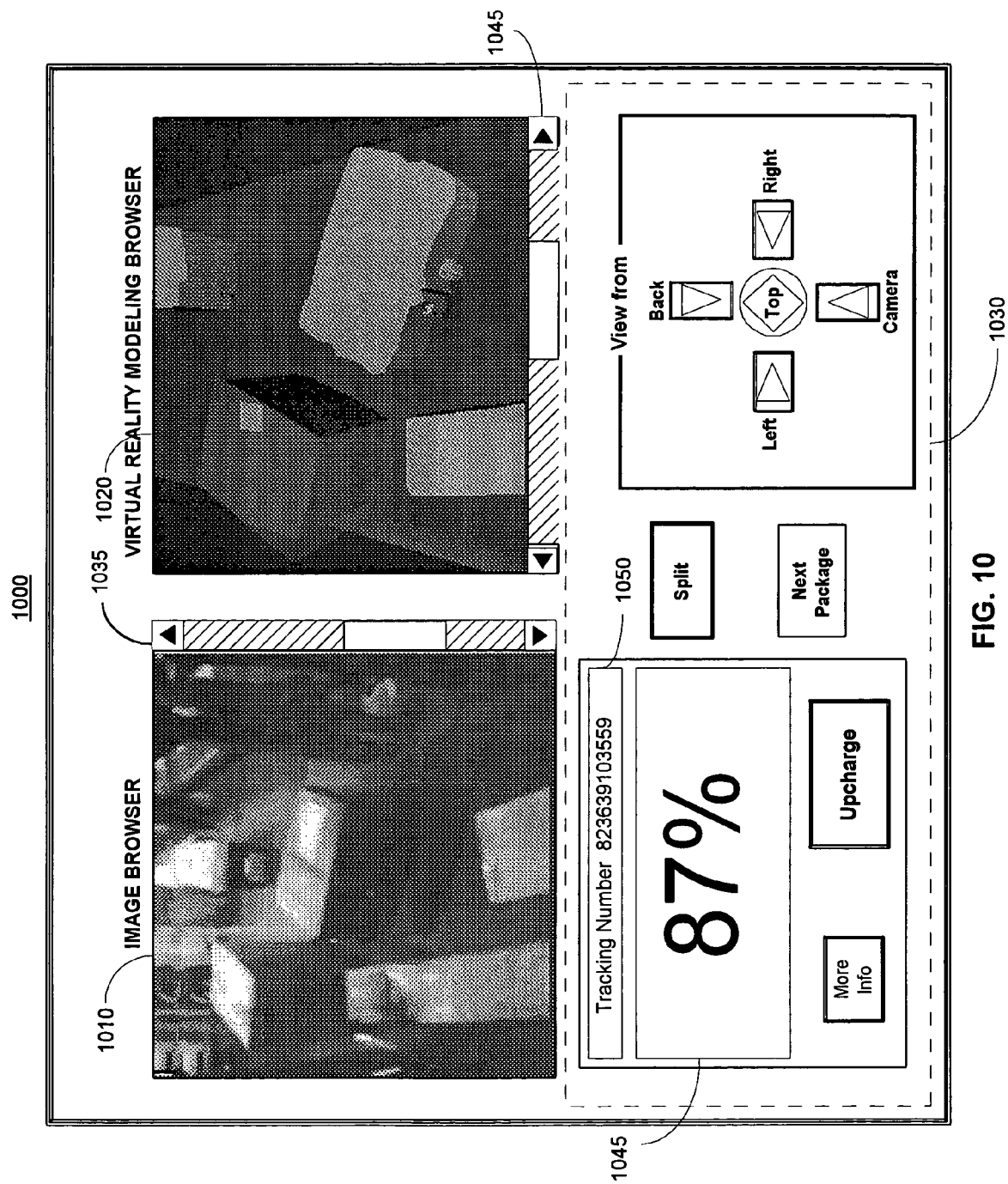
FIG. 10 is a representation of an exemplary software interface for use in collecting incremental dimensional revenue.

FIG. 10 is an exemplary software interface 1000 for use in collecting incremental dimensional revenue. The interface provides two separate data streams, an image browser 1010 which provides image information from a database 735, a virtual reality modeling language browser 1020, and a control and information panel 1030. The image browser 1010 allows the user to examine images of the parcels. The images are advance using a scrolling bar 1035. There is also a separate option where the images are streamed continuously to the user to provide an image of the objects moving along belt 250 over time.

The virtual reality modeling language browser 1020 displays a virtual landscape encompassing belt 250 and any objects on belt 250. The virtual landscape is compiled using the dimensional data produced by the vertical height scanners 200 of the parcel information capture systems 280. The user is given the option via view selector 1055 of control and information panel 1030 to manipulate the image by selecting different viewing angles for the virtual landscape. The angles are shown as, for example, top, back, left, right, and camera. The "camera" angle simulates the same view of belt 250 that is provided by the image browser. Using scrolling bars 1035 and 1045, the user is able to advance the parcel landscape in either direction. The control and information panel 1030 also supplies the dimensional confidence value 1040 and parcel identification code 1050 (shown as a tracking number) assigned to the parcel in question. The parcel may be identified in the virtual reality modeling language browser 1020 by, for example, displaying that parcel in a different color. The dimensional confidence value shown is 87%.

A number of options may be given to the user to alter the data. The user may be given the option to split the parcel, i.e., to chose a position to segment an object that was perceived by the parcel information capture system to be a single object when in fact two separate objects were present. Once the user initiates the split operation by, for example, clicking on a button on the interface, an algorithm may be applied to then try to resolve a valid shape from the combined outline. Alternatively, a user may be given the option to go in and edit the captured data points, e.g., the indices used to define the top surface of the object. The user can, therefore, remove individual irregularities in the outline of the parcel to, for example, remove outline irregularities induced by object not actually part of the parcel.

Using the information available to the user, an option is given to either upcharge the parcel, i.e., recover the dimensional weight revenue based on the calculated or altered data, or to move on to the next parcel.

In the pull data access process the user requests information from database 735 by forwarding a database query to server 730. The database query may be, for example, a package identification code (bar code, tracking number, airbill number). The query may also be a request for information from a specific parcel information capture system at a selected period of time. As discussed above, the proper server 730 having access to the proper database 735 will access the information and forward the results to the user. The database query may also provide a subset of information desired by the user, i.e., server 730 need not supply all available information about an object, but instead may supply only those categories of information requested by the user.

Figure 11:
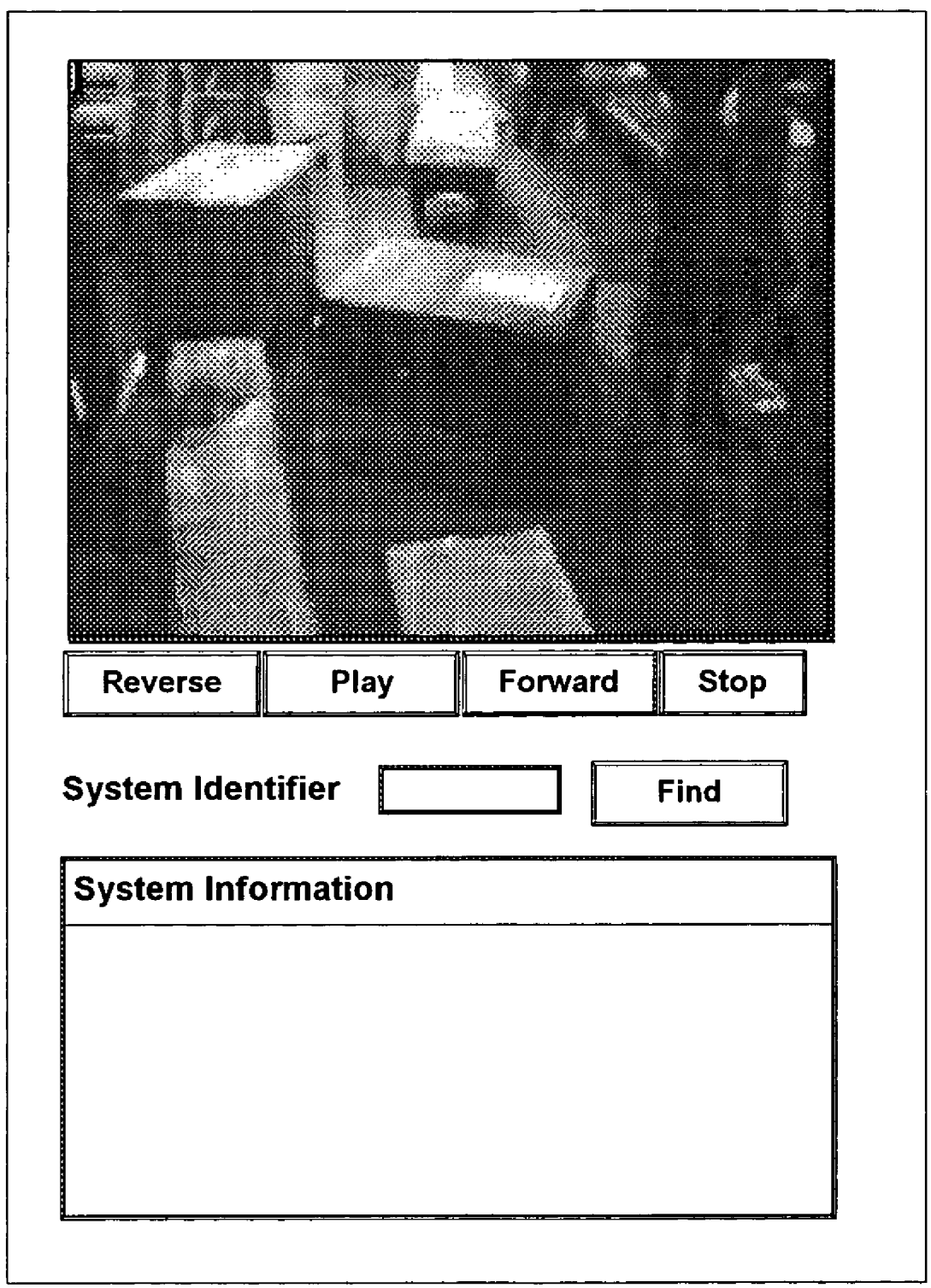
FIG. 11 is a representation of an exemplary software interface for use in providing security information.

One example of such a pull application would be access to the image information provided by camera server 255 to provide a security application. In such an implementation, a user would select a specific parcel information capture system 280 to view. The server 730 having access to the information provided by the information capture system 280 would access database 735 and forward the stored image information captured by parcel information capture system 280 at a selected time. FIG. 11 shows an exemplary software interface 1100 for providing the security information. Any period of time stored in a database may be accessed by a user (the database may store the information for a given period of time such as 120 days before erasing the information). The system may include a default, such that the information displayed to the user will be the information from the current date and time for the selected parcel information capture system 280. As shown in FIG. 11, the user is given the option to stop the flow of images, reverse the flow of images, or restart the flow of images.

Figure 12:
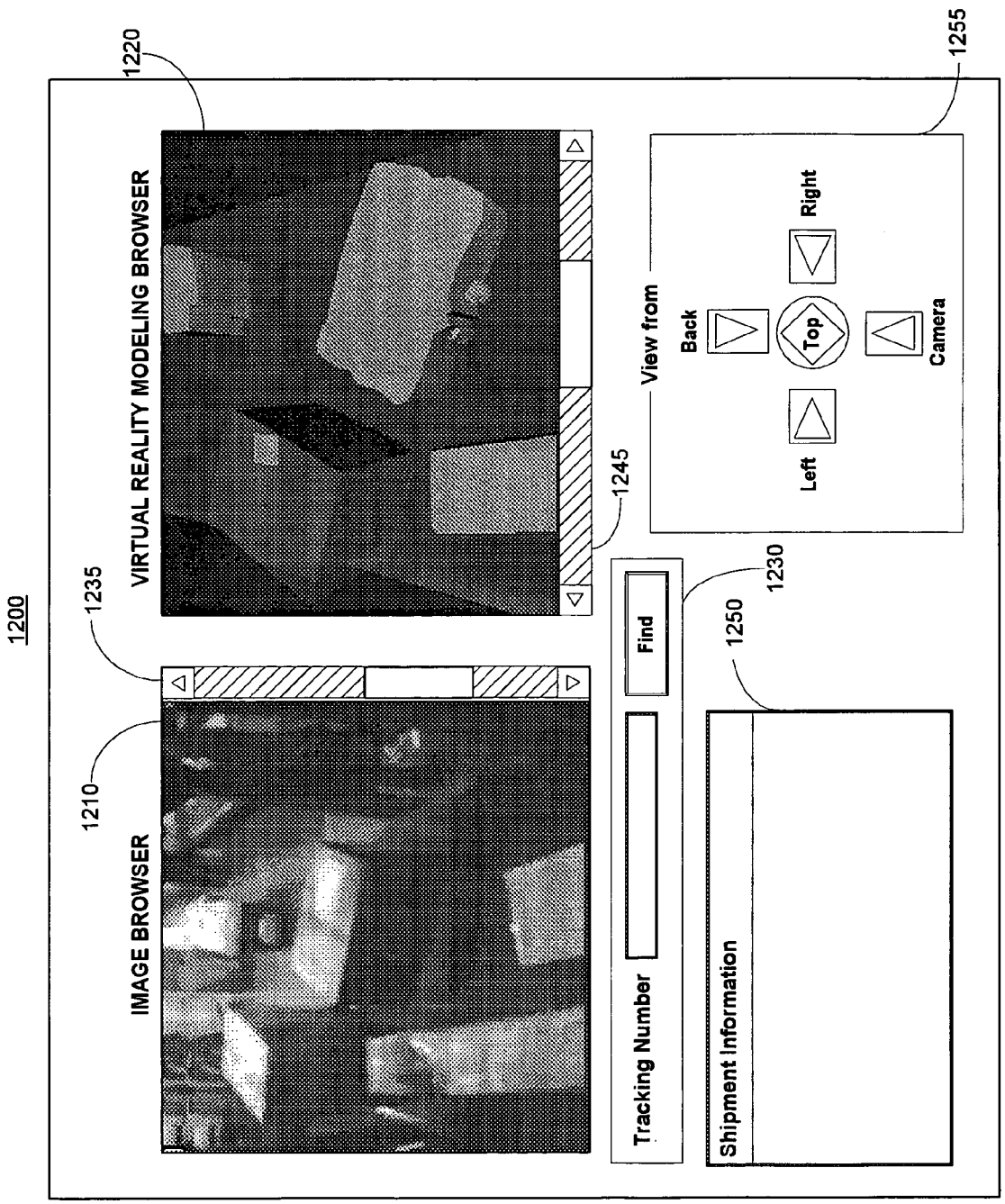
FIG. 12 is a representation of an exemplary software interface for providing parcel information to a user.

An alternative use the pull type of data access would be, for example, customer service, operations sort control, lost parcel attribute identification, and security and surveillance of package handling. The user supplies information about the object through a query and application driven object information is returned. FIG. 12 shows an exemplary software interface 1200 for use when locating a parcel based on a parcel identification number, e.g., bar code or tracking number. Many of the same options provided by interface 1000 are provided to users of interface 1200. The user inputs, for example, a parcel identification number into search field 1230 to start the search process. The system provides side by side views of image information in image browser 1210 provided by the camera processor 255 as the parcel passed camera 285 and a three dimensional model of the belt 250 and objects on belt 250 in virtual reality modeling browser 1220 as the parcel passed the dimensioning system. The default view provided in the modeling browser 1220 is the same perspective view as from camera 285. The user also has the option to change the perspective viewing angle of the three dimensional model to, for example, the opposite angle from the camera position (back), the right side, the left side, or a top view using view selector 1255. For situations where the viewing angle would result in the obscuring of objects because they are behind other objects, semitransparent viewing of the three dimensional modeled objects can be provided. The object in question can be shown by modeling browser 1220, for example, in a different color from other objects. Interface 1200 provides information about the object in shipment information window 1250.

It will be apparent to those skilled in the art that various modifications and variations can be made in the field of parcel information acquisition of the present invention and in construction of this parcel information system without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system, including transport means, for capturing information about objects moving on the transport means relative to the system, comprising:
a position system for providing positional information associated with the transport means;
an object dimensioning system for producing dimension information for the objects;
orientation means for determining an orientation of each object on the transport means using at least the positional information;
information capture means for obtaining information from each object, wherein the image capture means includes a plurality of scanning means and wherein each scanning means is simultaneously focused based on the orientation of the objects on the transport means;
an image capture system for producing images of the objects; and
at least one processor for associating time values with the positional information and computing models of the objects using the positional information and the dimension information.

2. A system, including transport means, for capturing information about objects moving on the transport means relative to the system, the system comprising:
an object dimensioning system for producing dimension information for each of the objects as each object moves relative to the object dimensioning system, the object dimensioning system including means for determining an orientation of each object on the transport means;
an object identification system for producing object identification information for the objects, the object identification system including at least one scanner that is focused based on the orientations of the objects on the transport means; and
an image capture system for producing images of the objects.

3. The system of claim 2, wherein the objects are parcels.

4. The system of claim 2, wherein the object dimension information, object identification information, and images each have time stamp information associated therewith.

5. The system of claim 4, wherein the object dimension information, the object identification information, and the images of each object are correlated based on the time stamp information.

6. The system of claim 2, wherein the plurality of scanners produce scanning beams that traverses paths.

7. The system of claim 2, wherein object dimension information associated with an object is correlated to object identification information associated with the same object using information about a scan pattern produced by at least one of the scanners and time information associated with the object dimension information and the object identification information.

8. The system of claim 2, wherein the object dimensioning system comprises at least one vertical height scanner.

9. The system of claim 2, wherein the object identification system includes a plurality of scanners that are simultaneously and independently focused based on the orientations of the objects on the transport means.

10. The system of claim 9, wherein the orientation determining means determines an orientation of each object on the transport means using at least positional information associated with the transport means.

11. The system of claim 2, wherein the object dimensioning system is operable to produce a model of each object by associating positional information values related to the transport means with the object dimension information.

12. The system of claim 2, wherein the orientation determining means determines an orientation of each object using at least positional information associated with the transport means.

13. The system of claim 2, further comprising at least one processor configured to associate the object dimension information, the object identification information, and the images for each of the objects.

* * * * *

UNITED STATES PATENT AND TRADEMARK OFFICE
CERTIFICATE OF CORRECTION

| | | |
|---|---|---|
| PATENT NO. | : 7,137,556 B1 | Page 1 of 1 |
| APPLICATION NO. | : 09/544120 | |
| DATED | : November 21, 2006 | |
| INVENTOR(S) | : Brett Bracewell Bonner | |

It is certified that error appears in the above-identified patent and that said Letters Patent is hereby corrected as shown below:

Title page, item [76] lines 1-6 should read:

Brett Bracewell Bonner, 1851 Oak Run Cove, Germantown, TN (US) 38138; Ole-Petter Skaaksrud, P.O. Box 38025, Germantown, TN (US) 38183; Gary Lynn Holmes, 8498 Mysen Cove, Cordova, TN (US) 38018

Signed and Sealed this

Sixth Day of March, 2007

JON W. DUDAS
*Director of the United States Patent and Trademark Office*